United States Patent [19]

Pompea et al.

[11] Patent Number: 4,589,972
[45] Date of Patent: May 20, 1986

[54] OPTICALLY BLACK COATING WITH IMPROVED INFRARED ABSORPTION AND PROCESS OF FORMATION

[75] Inventors: Stephen M. Pompea, Denver; Derek W. Bergener, Lakewood; Donald F. Shepard, Evergreen, all of Colo.

[73] Assignee: Martin Marietta Corporation, Bethesda, Md.

[21] Appl. No.: 635,732

[22] Filed: Jul. 30, 1984

[51] Int. Cl.4 .................. C25D 5/34; C25D 5/44
[52] U.S. Cl. .................... 204/29; 204/37.6; 204/38.3; 204/42; 204/58; 126/901
[58] Field of Search ............ 126/901; 204/38.3, 58, 204/56 R, 42, 29, 32.1, 33, 37.6

[56] References Cited

U.S. PATENT DOCUMENTS

| | | | |
|---|---|---|---|
| 2,638,815 | 5/1953 | Cory | 88/57 |
| 2,812,295 | 11/1957 | Patrick | 204/18 |
| 3,488,103 | 1/1970 | Webb | 350/58 |
| 4,013,465 | 3/1977 | Clapham et al. | 96/36 |
| 4,035,209 | 7/1977 | Okawara | 156/3 |
| 4,111,762 | 9/1978 | Wade et al. | 204/33 |
| 4,123,591 | 10/1978 | Karki | 428/454 |
| 4,145,234 | 3/1979 | Meissner | 148/6.27 |
| 4,148,294 | 4/1979 | Scherber et al. | 204/37.6 |
| 4,150,191 | 4/1979 | Karki | 428/454 |
| 4,209,569 | 6/1980 | Brugger | 428/472 |
| 4,252,865 | 2/1981 | Gilbert et al. | 126/901 |
| 4,256,546 | 3/1981 | Brugger | 204/33 |
| 4,267,218 | 5/1981 | Brugger | 428/35 |
| 4,396,643 | 8/1983 | Kuehn et al. | 427/160 |
| 4,440,606 | 4/1983 | Powers et al. | 204/33 |
| 4,442,829 | 4/1984 | Yanagida et al. | 204/33 |
| 4,448,487 | 5/1984 | Cuomo et al. | 126/901 |

FOREIGN PATENT DOCUMENTS

| | | | |
|---|---|---|---|
| 0491501 | 9/1976 | Australia | 126/901 |
| 0026014 | 9/1979 | Japan | 204/37.6 |

OTHER PUBLICATIONS

"Preliminary Performance Data on an Improved Optical Black for Infrared Use," Pompea et al., *Proc. Society of Photo-Optical Instrumentation Engineers*, vol. 400, New Optical Materials (1983), 128.

*Primary Examiner*—John F. Niebling
*Assistant Examiner*—Terryence Chapman
*Attorney, Agent, or Firm*—Yount & Tarolli

[57] ABSTRACT

An optically black coating with improved infrared absorption is disclosed along with a process for formation therefor. An anodizable substrate is first treated in a surface modification step prior to anodizing to produce major surface modifications at least about 100 microns in width and at least about 50 microns in depth. Preferably, the depth is at least about ½ the width, and the modifications are present in a random series of irregularly sized modifications having widths from about 100 microns to about 1,000 microns and depths from about 50 microns to about 750 microns. A second aspect involves the use of steam for sealing the anodized surface.

10 Claims, 13 Drawing Figures

PRESENT INVENTION

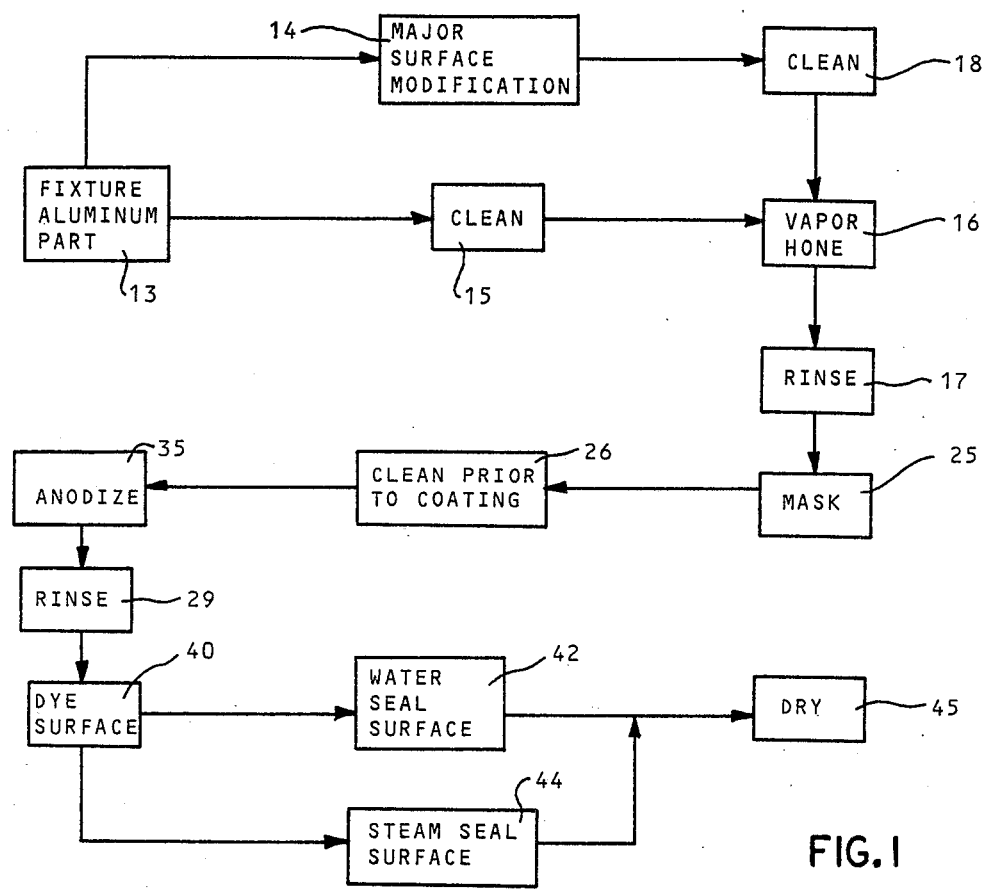
FIG. 1
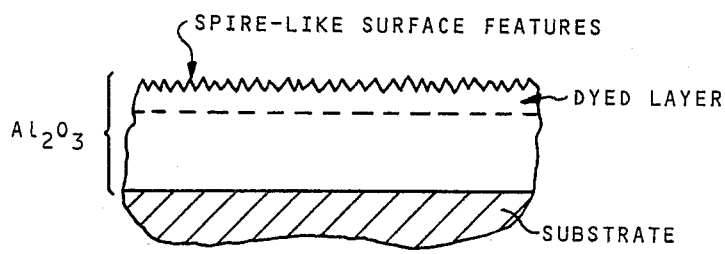
FIG. 11 U.S. PAT. 4,111,762
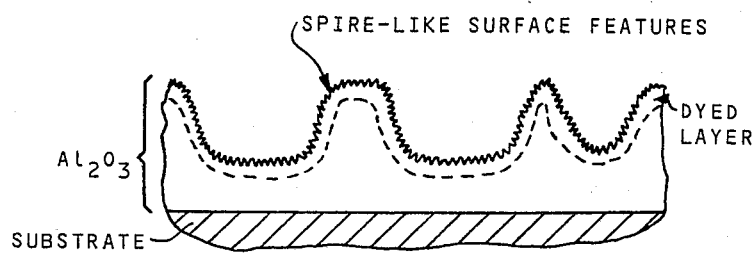
FIG. 12 PRESENT INVENTION

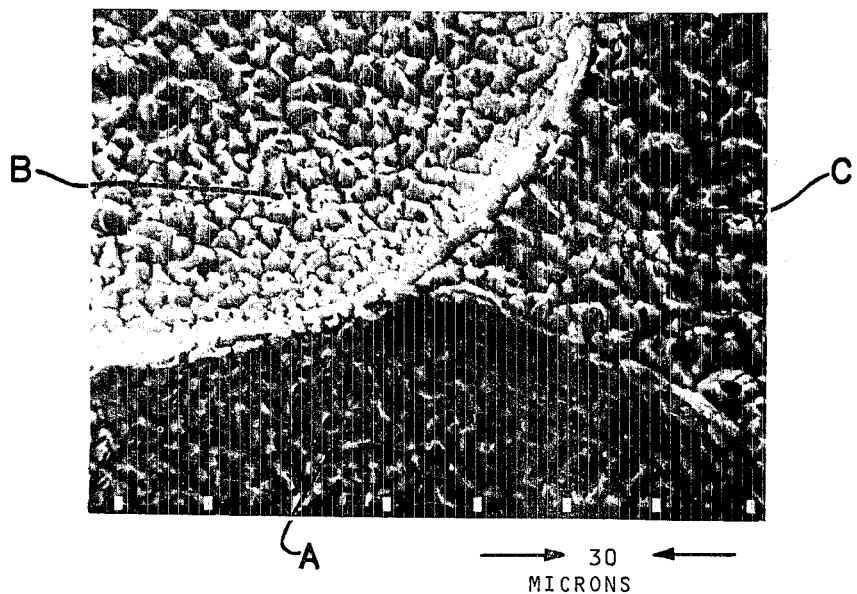
FIG. 2 PRESENT INVENTION
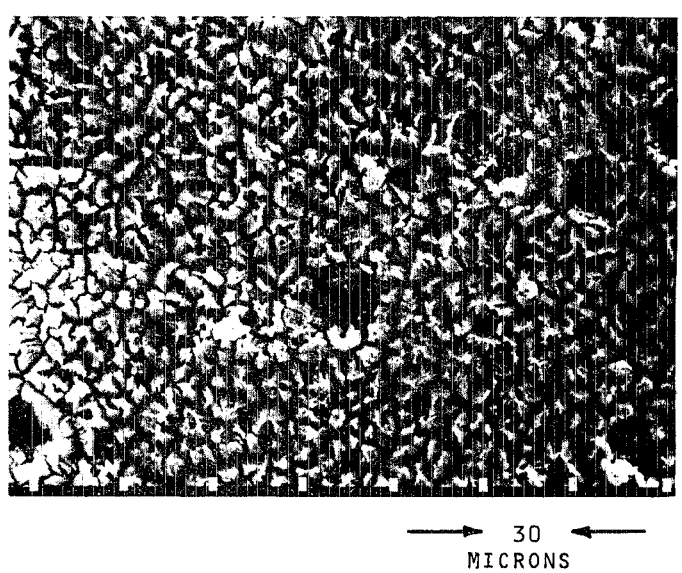
FIG. 3 U.S. PAT. 4,111,762

OPTICALLY BLACK COATING WITH IMPROVED INFRARED ABSORPTION AND PROCESS OF FORMATION

FIELD OF INVENTION

The present invention relates to a body having a surface which has the property of extremely low specular and diffuse reflectance of electromagnetic radiation therefrom, and with improved absorption in the infrared region. The invention also relates to methods of manufacturing such a body.

PRIOR ART

A variety of coatings are known for optical applications wherein it is sought to maximize absorption and minimize specular reflectance of light or electromagnetic radiation from the surface thereof. One such optically black coating using anodized aluminum is disclosed in Wade et al. U.S. Pat. No. 4,111,762. Optically black coatings are of particular interest for use in connection with infrared instruments.

In previous practice, thick black paints and anodized coatings, such as disclosed in U.S. Pat. No 4,111,762, have been used to coat surfaces in infrared instruments. However, both of those methods have certain limitations.

Black paints have a tendency to crack or separate from the metal substrate under thermal cycling conditions. Since many infrared instruments operate at liquid helium temperatures and undergo many thermal cycles, paint separation can be a significant problem. For increased absorption at longer wavelengths, thicker layers of paint are needed. An increase in the paint thickness aggravates the cracking or separation problem. Additionally, paints outgas losing up to 10% by weight after vacuum exposure. Some of the chemicals which outgas can be highly corrosive to microelectronic components. Furthermore, in a cryogenically cooled optical system, outgassed chemicals may condense onto cooled optical surfaces. Moreover, most infrared absorbing paints contain carbon black and recent experiments have shown that carbon black reacts with the five electron volt atomic oxygen prevalent at low earth orbits.

The anodized optically black surface produced in accordance with U.S. Pat. No. 4,111,762 eliminates the concerns of outgassing and adhesion noted above. Its effectiveness on surfaces for infrared instruments depends largely upon its ability to scatter or diffuse incident radiation. Recently, there has become a need for improved infrared absorption for infrared instruments and detectors, particularly for wavelengths from about 35 microns to about 1,000 microns. If the surfaces on an infrared instrument specularly reflect infrared radiation, the resultant off-axis stray light that hits the detector can reduce the signal-to-noise ratio. Absorption in the far infrared region has become even more important now that certain detectors and instruments have improved sensitivity into the far infrared region up to 1,000 microns.

SUMMARY OF THE INVENTION

The present invention improves upon the basic process of Wade U.S. Pat. No. 4,111,762 in two ways: first by adding a major surface modification step prior to anodization to produce relatively large craters, depressions and other indentations; and second, using steam sealing instead of hot water sealing.

In the first aspect of the present invention, the surface to be treated is modified prior to anodizing to produce a series of major surface modifications at least about 100 microns in width and at least about 50 microns in depth. The depth of the major surface modifications is important to the proper functioning of the present invention and preferably should be at least about ½ the width of the major surface modifications. The modifications can be produced in a variety of regular patterns or random series. Preferably, the major surface modifications constitute a random series of irregularly sized surface modifications having widths from about 100 microns to about 1,000 microns and depths from about 50 microns to about 750 microns. A random series of major surface modifications preferably includes the occurrence of depressions or protuberances of varying shapes and sizes. A random series is preferred to avoid any diffraction gratings being established by regularly occurring features. As explained in more detail herein, a variety of processes can be used to produce the major surface modifications, one particular process being preferred is photoetching. The product produced by the foregoing process is also claimed as a feature herein.

The second aspect of the present invention is the use of steam sealing in lieu of the hot water sealing disclosed in U.S. Pat. No. 4,111,762. Steam sealing should be conducted under pressure for at least about 2 minutes. Preferably, the steam sealing is conducted under pressure greater than 10 psig and from about 2 minutes to about 60 minutes. More preferably, the steam sealing is conducted from about 5 minutes to 40 minutes, with a time of 30 minutes at about 15 psig being found most preferable. The product produced in accordance with the foregoing process is also claimed as a feature herein.

Another aspect of the present invention involves the use of both the major surface modification described above and the steam sealing described above. Again, the product produced in accordance with that process is also claimed as a feature herein.

BRIEF DESCRIPTION OF THE DRAWINGS

Further advantages and features of the present invention will be apparent to those skilled in the art to which it relates from the following detailed description thereof made with reference to the accompanying drawings in which:

FIG. 1 is a flow diagram illustrating schematically the various steps in the process of manufacturing a body embodying the present invention;

FIG. 2 is a scanning electron microscope photograph of the surface of a product made in accordance with the present invention shown on a scale of 30 microns at 500×;

FIG. 3 is a scanning electron microscopic photograph of the surface of a product made in accordance with the process of U.S. Pat. No. 4,111,762 shown on a scale of 30 microns at 500×;

FIGS. 11 and 12 are schematic illustrations of surface features of a product made in accordance with U.S. Pat. No. 4,111,762 and the major surface modification step of the present invention.

DESCRIPTION OF PREFERRED EMBODIMENTS

Figure 4:
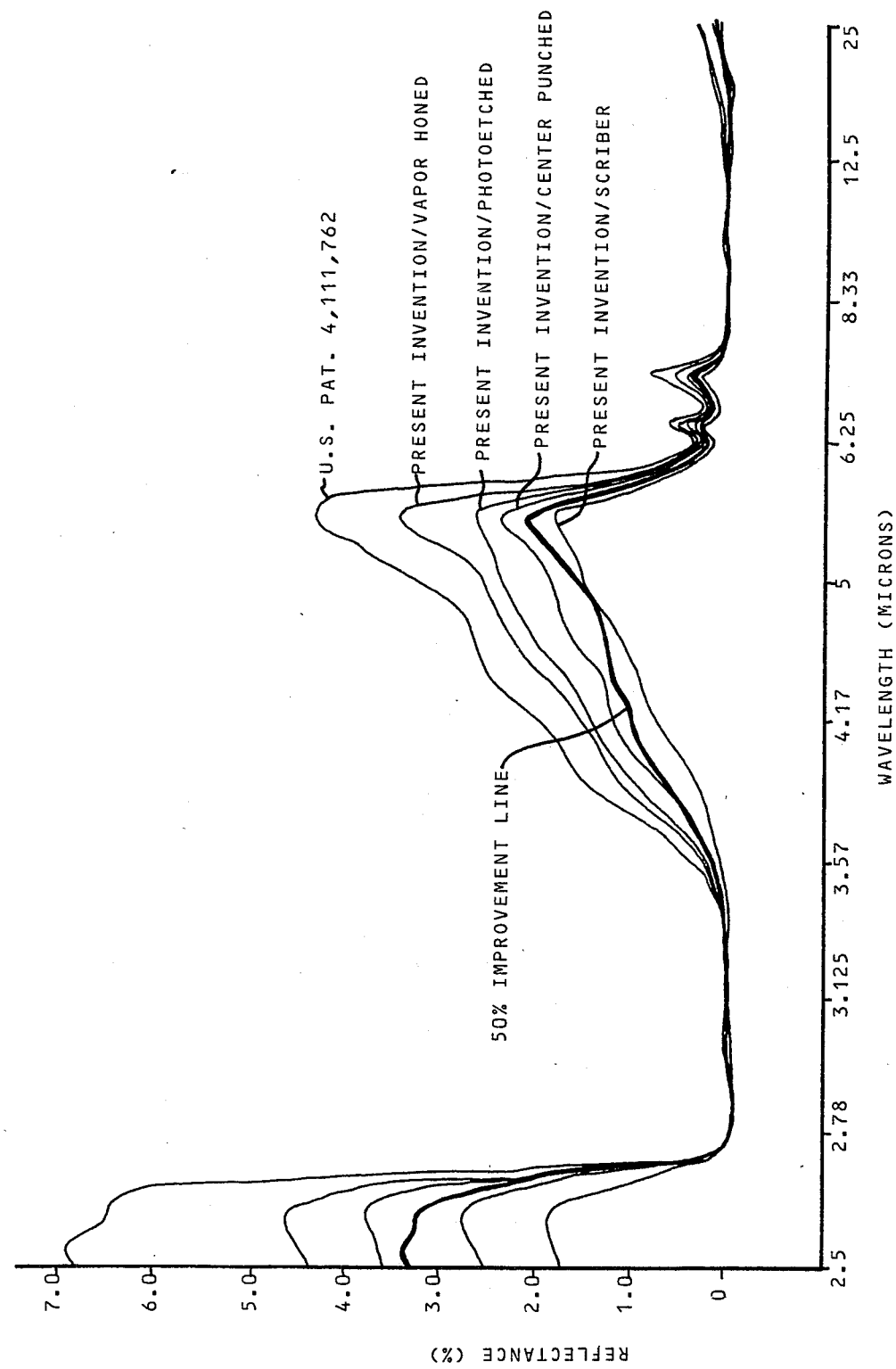
FIG. 4 is a comparative graph of biconical reflectance of the process of U.S. Pat. No. 4,111,762 and various surface modification processes and products in accordance with the present invention using hot water sealing in the range of 2.5 to 25 microns.

As used herein, the term "specular reflectance" is used to refer to reflection of electromagnetic radiation from the surface of an object where the angle of incidence equals the angle of reflection, i.e., mirror-like reflection. The term "anodizable metal or material" is used herein to refer to a metal such as aluminum or beryllium or their alloys which can be processed as an anode in an anodizing process to form an oxide surface thereon.

Basic Process of Wade U.S. Pat. No. 4,111,762

The present invention improves upon the basic process of Wade U.S. Pat. No. 4,111,762, which basic process will now be summarized. The disclosure of U.S. Pat. No. 4,111,762 is hereby expressly incorporated by reference as though repeated at length herein.

The object to be treated is composed of an anodizable metal, preferably having at least an anodizable surface thereof. Any anodizable metal such as aluminum or beryllium or their alloys can be used. The metal employed is preferably aluminum or its alloys since beryllium is toxic, and hazardous conditions are created by machining and otherwise working it. The term "aluminum", as used in this specification and claims, includes all the usual alloys of aluminum produced in various grades for different uses including, without limitation, the 2000, 5000, 6000 and 7000 series alloys. Among the aluminum alloys used have been alloys 2012, 2024, 6061 and 7075.

Initially, the piece or object whose surface is to be treated is cut to the required size and shape and an appropriate fixture is provided to hold the piece during the further processing thereof. Any suitable fixture may be used and such need not be shown or described in detail. After the object has been so fixtured, it is degreased to remove all stains, smudges, grease or oil therefrom. This cleaning is done in accordance with a normal industrial cleaning process, such as EPS 50036. The object is dried thoroughly and inspected for cleanliness and the cleaning cycle is repeated, if necessary. The steps of fixturing the aluminum part and the cleaning thereof are represented in the flow diagram of FIG. 1 as blocks 13 and 15.

After the object has been fixtured and cleaned, it is vapor honed as indicated by the block 16 in the flow diagram of FIG. 1. Depending on the effects of the major surface modification discussed below, it may be possible to eliminate the vapor honing step 16. The vapor honing involves the forcing of grit, preferably aluminum oxide (alumina) particles, against the surface of the object. Aluminum oxide grit of from about 100 to 200 mesh size (Alternative Sieve Designation, ASTM Standard Specification for wire cloth series for testing purposes) has been found suitable and it is satisfactory, particularly for the vapor honing of aluminum pieces, to force the grit in a slurry with water against the surface to be treated at approximately 120 pounds per square inch of air pressure and a water rate of 30 gallons per minute. Generally, the air pressure and water rate will be varied to suit the metal surface being treated. An air pressure of between about 80 to about 150 pounds per square inch and a water rate of about 25 to 35 gallons per minute is generally satisfactory for aluminum and its various alloys.

After the vapor honing operation, the object is rinsed in clear running water for approximately 5 minutes and dried thoroughly. The rinse step is indicated in block 17. The piece must not be touched by hand after the vapor honing operation to preclude smudging or staining the surface. If a particular pattern of the surface in accordance with the invention is to be applied to the roughened surface, then a masking step can be carried out prior to the cleaning step and, in fact, all areas not to be treated should be masked off at this point. Any suitable masking material may be utilized, such as an acid-resistant tape. The masking process must be done carefully so as not to soil the surface which is to be provided with the non-reflecting layer. After the masking operation, designated by block 25 in FIG. 1, the cleaning for the next step takes place, as indicated by the block 26 in FIG. 1.

The cleaning of the masked piece in preparation for the anodizing is performed by a caustic etch with a suitable etching solution (well known in the art) and a thorough water rinse. Any alumina grit which impregnates or lodges in the body is dissolved during the etching step. After the rinsing of the material, a cleaning of the surface with a suitable smut-removing chemical (also well known in the art) and an additional rinse is desirable. This cleaning step removes all foreign matter on the surface and the final rinse should be with distilled water. The object which is being treated should not be allowed to dry during the process as this could seriously impair the anodized layer which is to be immediately applied. An inspection should be made for complete cleanliness, and the cleaning should be repeated, if necessary.

After the cleaning indicated by block 26, the piece is treated by an anodizing process, as indicated by block 35 in FIG. 1. A preferred treating solution is an anodic solution at a temperature of approximately 70° F. and having a specific gravity of about 1.10 to about 1.13, preferably about 1.102 to about 1.128, at 70° F. The solution should be saturated with $CO_2$ by the use of dry ice.

Preferably, the anodizing solution is a solution of sulfuric acid having a specific gravity of from about 1.102 to about 1.128 at 70° F. This corresponds to a solution of about 13% to 17.5% sulfuric acid in water by weight. A preferred solution is one of sulfuric acid in deionized water. Carbon dioxide saturation may be attained by bubbling gaseous carbon dioxide into the aforesaid solution or by depositing pieces of dry ice therein.

The piece to be coated is submerged in the anodizing solution. The fixture or rod to which the piece is attached should be connected to the anode which is connected to a copper bar which extends across the tank containing the solution. The cathode can be attached to the tank lining. After the piece is secured, both mechanically and electrically in the tank voltage is applied slowly until approximately 12 to 25 volts is reached. The solution temperature is from about 80° F. to about 100° F. The material is then kept in the solution at 12–25 volts for a period of $\frac{1}{2}$ hour or more (if no dyeing is contemplated) or if dyeing is contemplated for a period of from approximately 1.5 to 2.5 hours, preferably 1.75 to 2.25 hours, and most preferably for about 2 hours. The piece is then removed from the tank and rinsed immediately in tap water for approximately 3 minutes, as indicated by block 29 in FIG. 1.

The object, after the anodizing step is performed, may be dyed to the desired color, either black (preferred for overall lowest visible light reflectance) or another color for decorative effect or minimum reflectance in certain wavelength ranges. Generally, if it is desired to provide the highly effective optical properties having high absorption in both the visible and infrared wavelengths, the piece is dyed black in the dyeing step, which is indicated by block 40 in FIG. 1.

The entire object may be immersed in a suitable dye bath for the required length of time. For purposes of black dyeing, a black dye bath which may be formed of either Nigrosine (pH 7.5–8.5 in tanks lined with PVC; pH 5.5–6.5 in unlined tanks) or Sandos MLW (pH 3.5–4.5) or their equivalent, at a temperature of approximately 150° F. is used. A concentration of 5 gms per liter Nigrosine or 10 gms per liter MLW is used. The object is held in the dye bath for approximately 15 minutes. The dyeing process increases the light absorbing efficiency in the visible range of the surface of the piece and minimizes the reflections therefrom. After the dyeing step, the piece is rinsed in running tap water for not less than 3 minutes to remove excess dye.

After the piece has been dyed, the surface of the piece may be hot water sealed as indicated on the flow diagram by block 42. For purposes of sealing the surface, the piece is immersed in a tank of distilled water for approximately 2 minutes where the water temperature in the tank is preferably approximately 190° F. After the piece has been submerged for 2 minutes, it may be removed from the sealing tank and allowed to dry in the air. The temperature at which the hot water sealing step is carried out preferably should not be greater than about 200° F. In order to stabilize the dye against washing out, the sealing temperature should probably be not less than about 180° F. Accordingly, the preferred range of temperature of the water in which the hot water sealing is carried out is 180° F. to 200° F., more preferably, 185° F. to 195°·F. A preferred sealing temperature is 190° F. Sealing is carried out by immersing the body to be sealed in heated water for a period of about 2 minutes. An excessively high temperature of sealing, or an unduly long residence time in the sealing bath, will adversely affect the structure of the oxide layer and tend to diminish the absorption characteristics of the surface of the invention.

Vacuum drying of the sealed surface by heating it in a vacuum chamber and "back filling" the thus dryed surface with hydrogen fluoride enhances the optical properties of the surface. This step is illustrated by block 45 and is deemed optional in the context of the present invention. Specifically, the specular reflectance peak values encountered at wavelengths below 6 microns and above 1 micron can be reduced by such treatment of the surface. The vacuum drying and hydrogen fluoride treatment step may be carried out by placing the material containing the oxide layer (which may be dyed and sealed) into a vacuum chamber and imposing a vacuum thereon while heating the material to an elevated temperature. Under the combined action of the heat and the low pressure, water and other hydroxyl group compounds will, of course, vaporize from the oxide layer and the aluminum surface, and are withdrawn from the chamber. The chamber is maintained under vacuum and back-filled with dry hydrogen fluoride gas and the dry hydrogen fluoride atmosphere is maintained thereover for a period of time. The object may then be removed from the chamber and placed in use.

Preferably, a vacuum having a pressure of not substantially greater than about 1 millimeter of mercury (1 mm Hg), a temperature of at least 105° C. and a hydrogen fluoride back-fill to at least about 50 mm Hg pressure and a contact time of at least about $4\frac{1}{2}$ hours is preferred. More preferably, a temperature of 105° C. to 110° C. is utilized.

Major Surface Modification of the Present Invention

One aspect of the present invention comprises modifying the surface structure prior to anodizing to produce major surface modifications at least about 100 microns in width and at least about 50 microns in depth. The depth of the major surface modifications (i.e., craters, depressions, indentations, etc.) are preferably at least about $\frac{1}{2}$ the width thereof.

The major surface modifications can be produced in a variety of regular or irregular series or patterns, a random series of irregularly sized modifications being preferred to avoid any diffraction grating effect and to present different sized craters to incoming radiation. In any given series or pattern the surface modifications can vary in shape and size. Preferably, the major surface modifications should have a width from about 100 microns to about 1,000 microns and a depth from about 50 microns to about 750 microns.

The major surface modification step is schematically illustrated as block 14, and it is followed by a cleaning step 18, which can otherwise be identical to cleaning step 15 or modified to insure removal of all materials used in the major surface modification step 14. Depending on the results of the major surface modification step 14, the vapor honing step 16 can be eliminated.

The increased surface roughness characteristics of the present invention have a significant effect on the absorbtivity and reflectivity of the surface. The surface features in accordance with this aspect of the present invention reduce specular reflectance and scatter the incident radiation causing multiple reflections from the surrounding surface features and therefore increase the number of points of possible absorption before the incident radiation is directed from the surface.

The process of U.S. Pat. No. 4,111,762 produces regularly-sized, spire-like, surface roughness features which are from about 0.5 microns to a maximum of 20 microns wide and up to a maximum of 15 microns in depth with the most being about 10 microns or less in depth or width. These produce good absorption in the ultraviolet and visible range. However, the surfaces produced in accordance with that patent are poor absorbers in the near infrared to the far infrared region.

The significant difference between the surface of the present invention and the spire-like surface features of U.S. Pat. No. 4,111,762 is schematically illustrated in FIGS. 11 and 12. FIG. 11 shows the spire-like surfaces produced in accordance with U.S. Pat. No. 4,111,762. FIG. 12 illustrates the major surface modifications of the present invention while still preserving the spire-like surface features found to be so desirable in the process of U.S. Pat. No. 4,111,762.

FIGS. 2 and 3 are scanning electron microscope (SEM) photographs of the major surface modifications of the present invention (FIG. 2) and of the product of U.S. Pat. No. 4,111,762 (FIG. 3). Both photographs show a scale at the lower edge where each division represents 30 microns, each photograph being a 500× enlargement. FIG. 3 shows the spire-like features of U.S. Pat. No. 4,111,762. FIG. 2 shows similar spire-like features superimposed on the large undulations or major surface modifications of the present invention. In FIG. 2, two large craters (A and B) are shown meeting at a common ridge; the area marked C is a high plateau area between craters.

As indicated above, the depth of the modifications or indentations should be at least ½ the width. Preferably, the holes, indentations, etc. should be at least as large in diameter as the wavelength of the incident radiation. The shape of the modifications may vary. Conical and spherical indentations or surface modifications are acceptable, but other shapes, e.g., pyramidal, may also function.

A variety of surface modifying steps can be utilized in accordance with the present invention so long as the indentations or modifications result in the sizes and shapes indicated above. The following processes have been found successful in accordance with the major surface modification aspect of the present invention:

(1) deformation of the surface by mechanical means such as a center punch, vibrating scriber, or pressing sandpaper against an aluminum substrate in a vise, etc.;
(2) photoetching; and
(3) chemical etching with hydrochloric acid by itself or in combination with the other methods listed above.

Photoetching is preferred and is used in conjunction with a photoresist exposed through a mask. The preferred form is a random series of modifications having varying sizes. A variety of different masks can be created by available computer software which can randomly vary the size and pattern of the dots on the mask. The depth of the indentations can be varied depending on the length of the etching process. Photoetching can also be varied by using a number of different masks and a number of successive etching operations. Photoetching otherwise can be accomplished in accordance with known techniques.

Other methods could be utilized in accordance with the present invention so long as the major surface modifications produced are in the desired size range. Some methods in this classification include:

(1) photoetching with a photoresist applied by an automatic pen plotter applying the photoresist in a series of dots;
(2) the combination of a vibrating scriber or center punch followed by a resist applied with a roller and subsequent etching, the purpose being to protect the peaks and allow etchant to attack the substrate as deeply as possible;
(3) creating diffraction patterns mechanically or printing the pattern in conjunction with photoetching;
(4) electric discharge machining;
(5) knurling;
(6) sputtering;
(7) moiré and holographic patterns in conjunction with etching; and
(8) sprinkling sand or some other hard granular material on the substrate followed by subsequent pressure applied to the granular material by a flat plate.

The appearance of a surface produced in accordance with U.S. Pat. No. 4,111,762 as shown in FIG. 3 and the appearance of the major surface modifications of the present invention as shown in FIG. 2 is apparent. In conjunction with FIGS. 11 and 12, it will be seen the major surface modifications of the present invention are significantly different in size than the spire-like features produced in accordance with U.S. Pat. No. 4,111,762.

Steam Sealing of the Present Invention

The second aspect of the present invention is the use of steam sealing instead of hot water sealing. The steam sealing step can be used in lieu of the hot water sealing step of U.S. Pat. No. 4,111,762 and with or without the major surface modification step described above. It has been found that the steam sealing process greatly reduces the reaction effects of atomic oxygen and also greatly reduces the specular reflectance in the near to middle infrared region.

The steam sealing step is shown in FIG. 1 in block 44. The object can be steam sealed in an autoclave, pressure cooker, or other chamber. The object is steam sealed from about 2 to about 60 minutes, preferably from about 5 to 40 minutes, and most preferably about 30 minutes. Improvements in sealing have been encountered in using times up to 30 minutes, as for example, compared to 10 minutes. The object is steamed under pressure, generally above about 10 psig. Pressures in the range of about 14 to about 15 psig have been used, but higher pressures could be used. The temperature used is 100° C. or higher. The water can be distilled water or other suitable source of clean, deionized water.

Advantages and Uses

The process of the present invention using the major surface modification step results in surface features as large as 1,000 microns while still preserving the small surface features of U.S. Pat. No. 4,111,762. This results in maintaining absorption of ultraviolet and visible radiation while improving absorption and reducing the specular reflectance in the infrared region, particularly from about 1 micron to about 500 microns, and probably to 1,000 microns.

The major surface modification step in accordance with the present invention results in a surface which is not a specular reflector in the infrared region. For example, the specular reflectivity at a wavelength of 300 microns is only 7% in accordance with the major surface modification of the present invention while the specular reflectivity of an object produced in accordance with U.S. Pat. No. 4,111,762 is 71%. This tenfold gain in specular performance may have an even greater effect in a system where each stray incident ray undergoes at least three surface interactions (reflections) before hitting the detector of an optical system.

Figure 5:
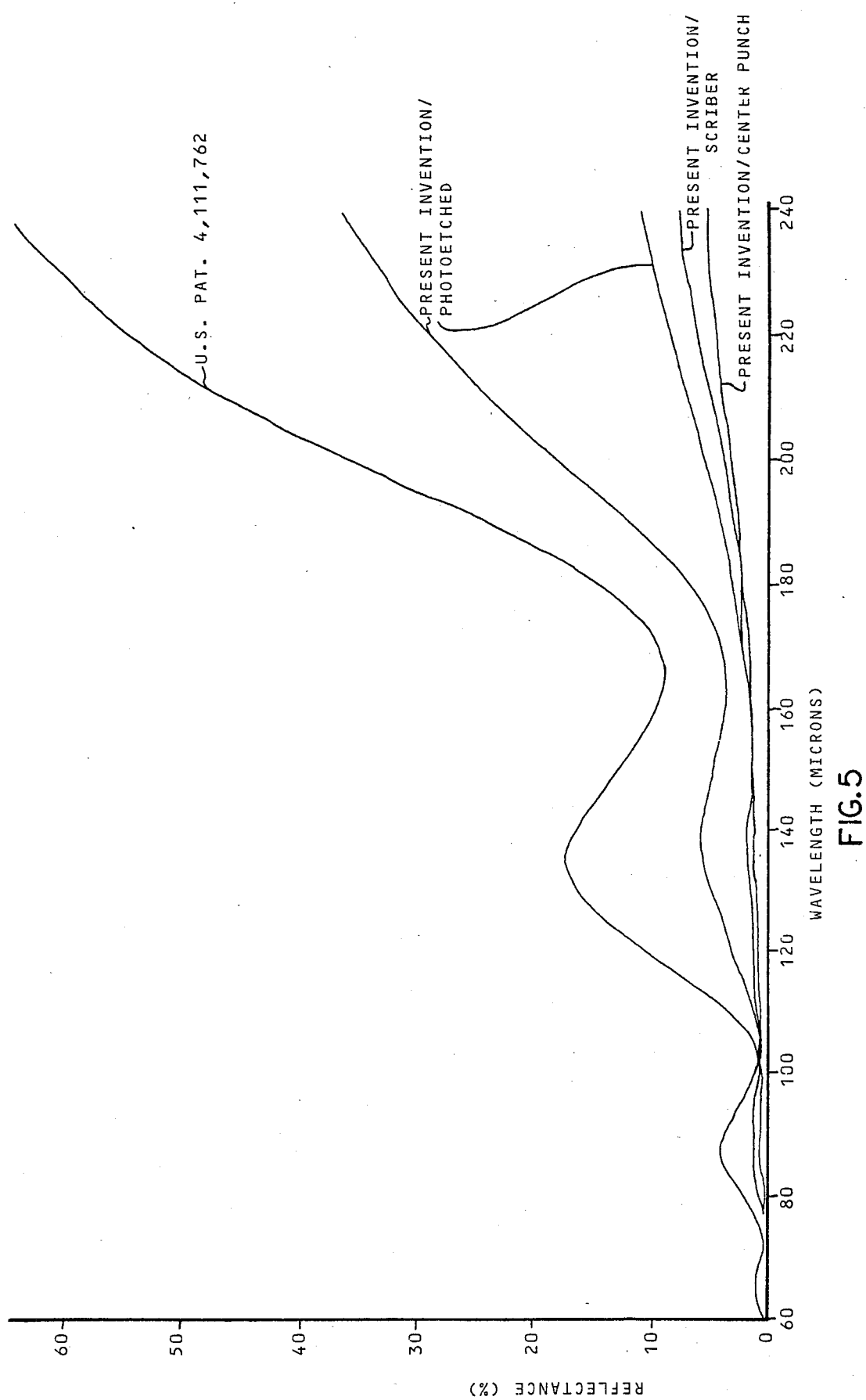
FIG. 5 is a comparative graph of specular reflectance of the process of U.S. Pat. No. 4,111,762 and various surface modification processes and products in accordance with the present invention using hot water sealing in the range of 60 to 240 microns.
Figure 6:
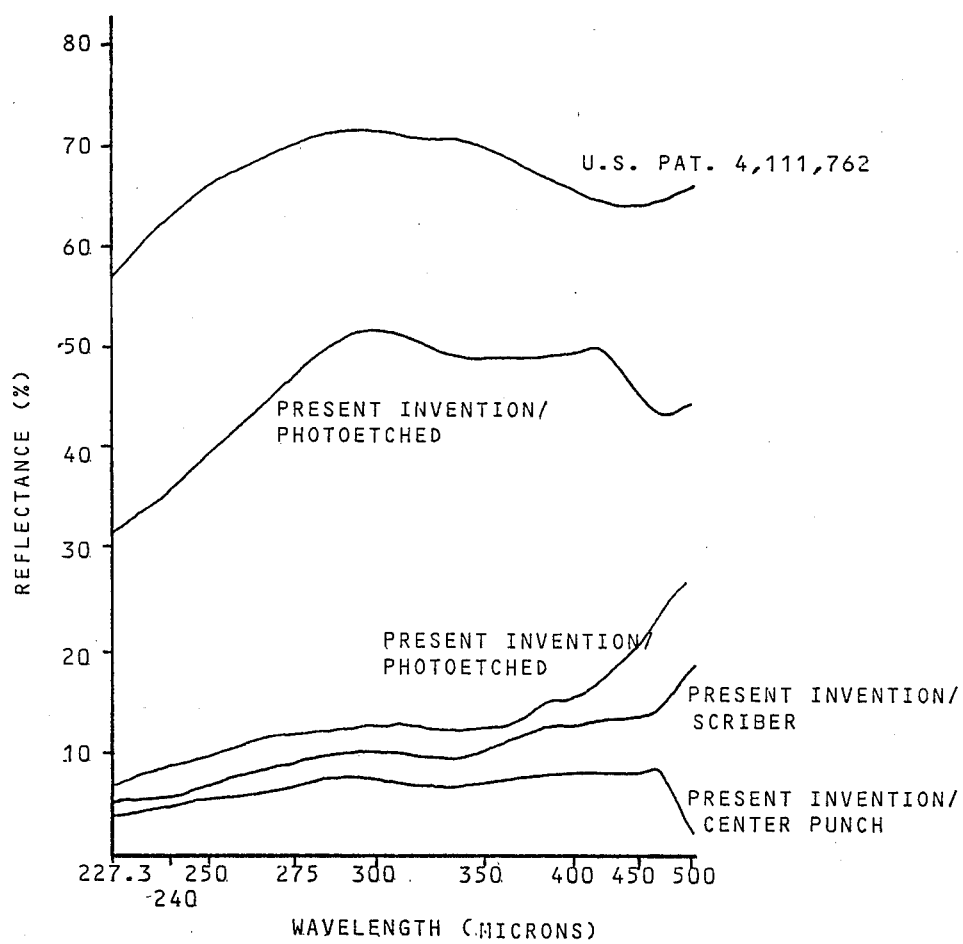
FIG. 6 is a comparative graph of specular reflectance of the process of U.S. Pat. No. 4,111,762 and various surface modification processes and products in accordance with the present invention using hot water sealing in the range of 227.3 to 500 microns.

The improvement of the surface modification step of the present invention is graphically illustrated in FIGS. 4–6. FIG. 4 compares the percentage of biconical reflectance for a surface produced in accordance with U.S. Pat. No. 4,111,762 and various surface modification processes and products of the present invention, using hot water sealing and for the range of 2.5 to 25 microns. A 50% improvement line is also illustrated for ease of comparison. It will be seen that the major peaks at about 2.5 and 5 microns of the process of U.S. Pat. No. 4,111,762 are significantly reduced in accordance with the present invention. This illustrates the improvement of the major surface modification aspect of the present invention for the near infrared region.

FIG. 5 is a comparison of specular reflectance for the far infrared region (i.e. 60 to 240 microns). Again, the surface modification aspect of the present invention produced a significant improvement in the early peaks at 65, 87 and 135 microns of the process of U.S. Pat. No. 4,111,762 and a very significant reduction in specular reflectance above about 180 microns.

Figure 10:
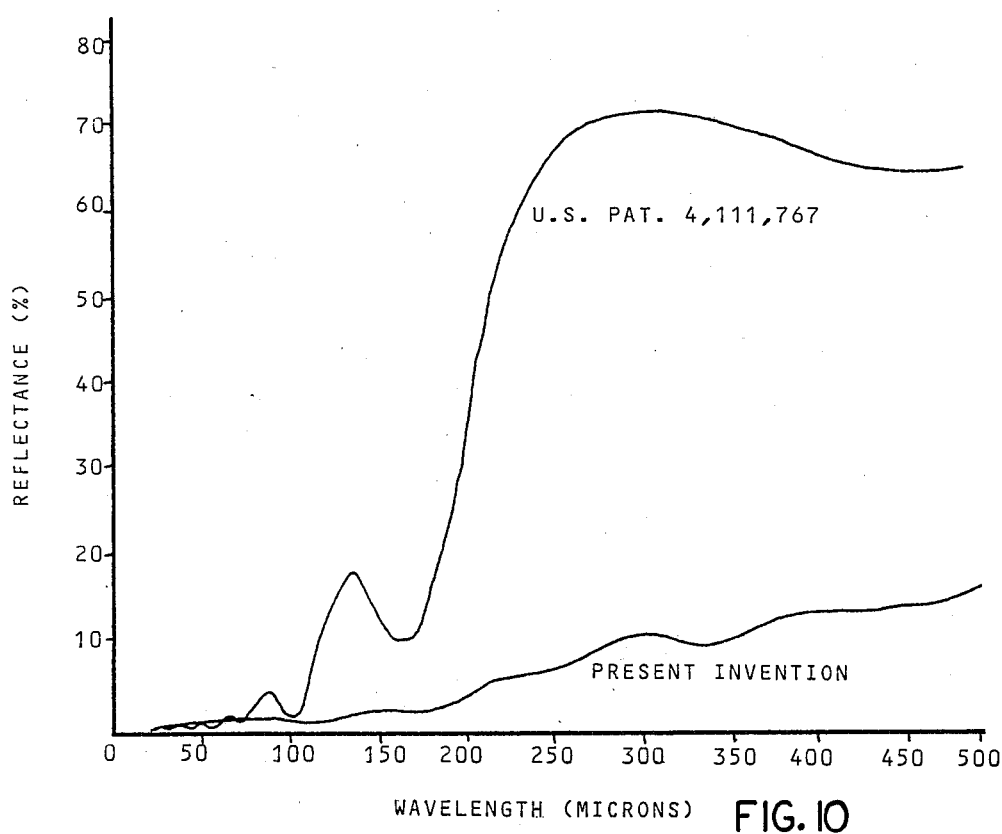
FIG. 10 shows a comparative graph of specular reflectance of U.S. Pat. No. 4,111,762 and the present invention for wavelengths from about 50 microns to about 500 microns using the major surface modification with a hot water seal in accordance with the present invention.
Figure 13:
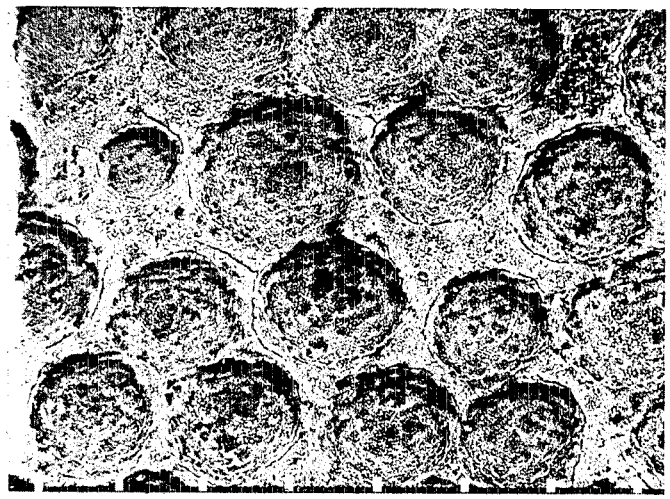
FIG. 13 is a scanning electron microscope photograph of the surface of a product made in accordance with the present invention shown on a scale of 300 microns at 50×.

FIG. 6 is similar to FIG. 5 and shows the improvement of the present invention compared to U.S. Pat. No. 4,111,762 for the far infrared region (i.e., about 230 microns to about 500 microns). For wavelengths greater than about 500 microns (not shown), the specular reflectance of U.S. Pat. No. 4,111,762 is greater than 70%. In contrast, the specular reflectance in accordance with the present invention rises from less than 20% at 500 microns and does not reach 70% specular reflectance until about 1,000 microns. FIG. 10 is a similar comparative graph of specular reflectance for wavelengths from about 50 microns to about 500 microns for the major surface modification in accordance with the present invention.

Some of the advantages of the steam sealing in accordance with the present invention are as follows.

During hot water sealing in accordance with U.S. Pat. No. 4,111,762, some of the dye will be removed from the surface of the object. Since the water used for hot water sealing has the same pH and a higher temperature than the sealing solution, temperature and concentration gradients are established allowing dye to leave the surface. Steam sealing minimizes any removal of dye from the anodized surface.

Hot water sealing in accordance with U.S. Pat. No. 4,111,762 is relatively short, i.e., on the order of 2 minutes. Small errors in residence time in the hot water sealing can affect the final surface, whereas small errors in residence time in steam sealing in accordance with the present invention will affect the final surface very little, if any.

In the near infrared region, a steam sealed object in accordance with the present invention shows a reduced diffuse and specular reflectance and improved absorption. Improved absorption and reduced biconical reflectance are also obtained in the middle infrared region. The steam sealing therefore offers the advantage of reduced specular reflectance in the near and middle infrared regions, while maintaining the very low hemispherical reflectance and high absorption of hot water sealing in the ultraviolet and visible regions. Steam sealing in accordance with the present invention improves infrared absorption from about 1 micron to at least about 10 or 25 microns.

Figure 7:
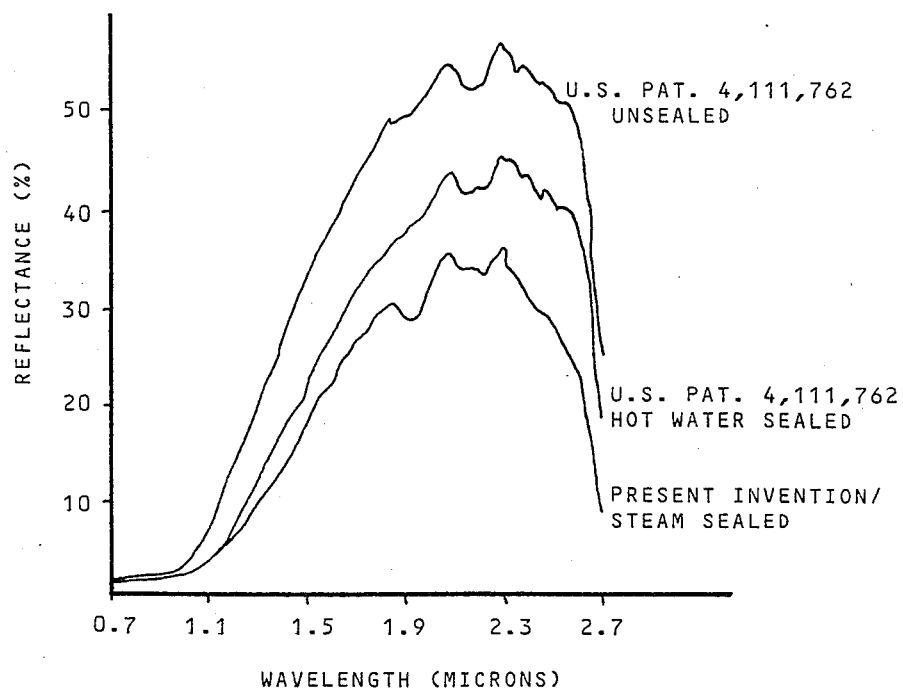
FIG. 7 is a comparative graph of hemispherical reflectance of unsealed and hot water sealed products in accordance with U.S. Pat. No. 4,111,762 and steam sealing in accordance with the present invention without the major surface modification step for wavelengths from 0.7 to 2.7 microns.
Figure 8:
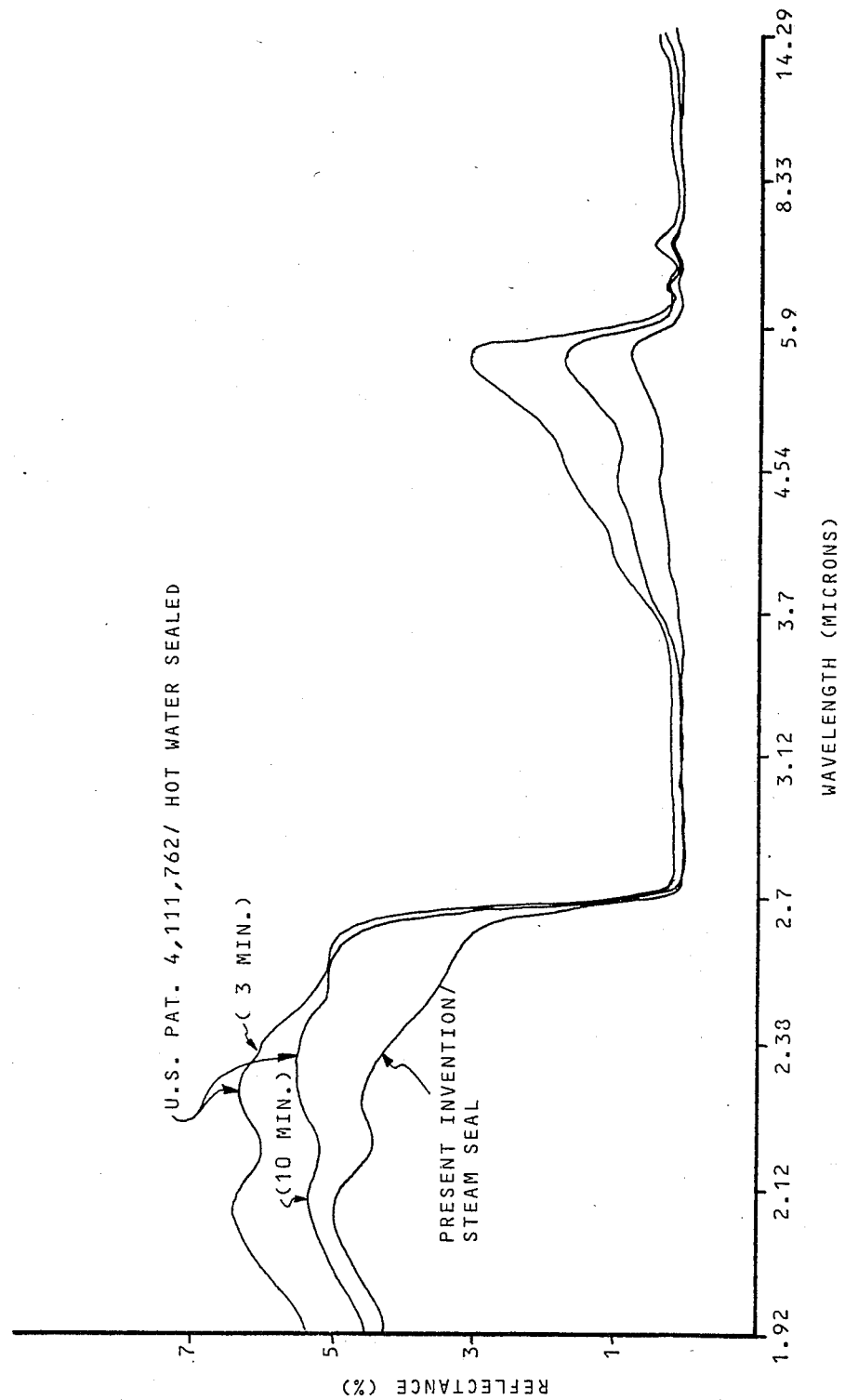
FIG. 8 is a comparative graph of biconical reflectance of two hot water sealed samples of U.S. Pat. No. 4,111,762 and the steam sealing of the present invention without any major surface modification of the present invention for wavelengths from about 1.9 microns to about 14 microns.

The improvement of the steam sealing aspect of the present invention is graphically illustrated in FIGS. 7 and 8. FIG. 7 illustrates the percentage of hemispherical reflectance in wavelengths from 0.7 to 2.7 microns for (i) the process of U.S. Pat. No. 4,111,762 without hot water sealing, (ii) the same process of that patent with hot water sealing and (iii) the present invention with steam sealing but without the major surface modification. Again, the improvement in hemispherical reflectance is evidenced by the steam sealing in comparison with hot water sealing. FIG. 8 shows the percentage of biconical reflectance for wavelengths of about 1.9 to about 14 microns. FIG. 8 compares the process of U.S. Pat. No. 4,111,762 using hot water sealing for three minutes and ten minutes with the present invention using steam sealing but without the major surface modification. The steam sealing was done for about 30 minutes at 14 psig. Again, the improved absorption and reduced reflectance are illustrated.

Another advantage in steam sealing in accordance with the present invention is the resistance to attack by atomic oxygen. Five electron volt atomic oxygen reacts chemically with most materials to modify their light absorbing properties. Steam sealing in accordance with the present invention makes the surface of the object nearly impervious to the attack by such atomic oxygen and also greatly improves absorption and reduces specular reflectance in the near and middle infrared regions.

Figure 9:
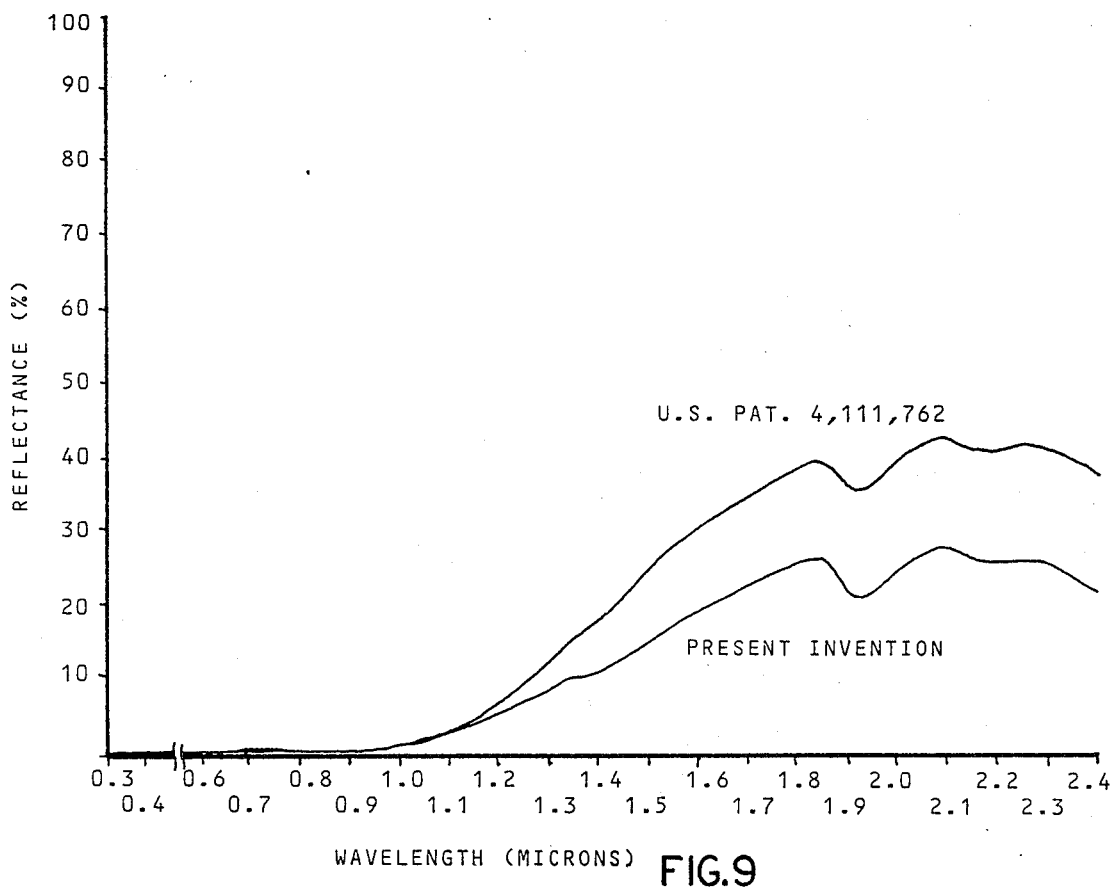
FIG. 9 shows total hemispherical reflectance measurements of a sample produced in accordance with U.S. Pat. No. 4,111,762 and the present invention which has both the major surface modification step and the steam sealing step for wavelengths of 0.3 microns to 2.4 microns.

The combined improvement of the major surface modification step and the steam sealing aspect of the present invention is graphically illustrated in FIG. 9. FIG. 9 compares the process of U.S. Pat. No. 4,111,762 with a surface made in accordance with the present invention using both the major surface modification and the steam sealing. Steam sealing was done for about 30 minutes. The wavelengths shown in FIG. 9 are from about 0.3 microns to 2.4 microns.

Objects using the major surface modification and/or the steam sealing in accordance with the present invention and the processes therefor can be used in a variety of applications where infrared absorption, environmental resistance, or diffuse reflectance are important. Some of these applications include infrared calibration reference sources, laboratory and research grade infrared spectrophotometers, vacuum chamber walls, infrared optical instruments, radiometers, and solar panels.

EXAMPLE

Metal Cleaning and Preparation

An aluminum alloy 6061 T6 object was cleaned and prepared; the surface was deburred and made free of machining oil. The metal was cleaned in an acetone bath for three minutes (small pieces were cleaned in ultrasonic acetone bath, if possible). Then the piece was spray rinsed with methyl ethyl ketone, acetone, and propanol and allowed to dry thoroughly in air (or in an oven).

Photoresist

The aluminum object was next coated with a photoresist by a dipping process. (The resist could also be sprayed or applied by other methods.) The photoresist used was AZ1350J made by Shipley and is sensitive to light with wavelengths between 365 and 405 nanometers. The photoresist was handled in yellow light to avoid premature exposure.

The part was lowered into a photoresist tank until it was completely submerged. The object remained submerged for one minute to assure that the photoresist wetted the entire surface. The object was slowly removed from the tank by a motor/pulley withdrawal mechanism at the rate of 3 lineal inches per minute until it was completely removed from the photoresist tank. The object was allowed to hang for 15 minutes to air dry the photoresist. The 3 in./minute withdrawal rate produced a photoresist coating that was about 6 microns thick over the whole part. Care was taken in handling and clamping the object to avoid scratching the photoresist. The object was then placed in a horizontal position in a free convection oven at 60° C. for 20 minutes.

Photomask

A photomask was prepared from a computer generated, quasi-random dot pattern on Kodak's Kodalith Ortho film number 3556. A master of the random dot pattern was produced on a computerized photoplotter driven by a computer program. The final position of each dot was determined by first generating an imaginary array of dot locations in a triangular close-packed pattern. The distance, p, between each of the imaginary points was 0.5 mm. Larger spacing could also be used. An imaginary circle with radius $r = p/3$ was generated around each imaginary dot location. An actual dot was then randomly positioned inside each imaginary circle. The diameter of each dot was 0.001 inches. The result is a random pattern of small black dots on a clear background. Workhorse photomasks, which have a transparent dot on a black background, are then prepared from the master by stepping and repeating the master pattern to produce the desired size workhorse. Chartpak's A-7 adhesive was then coated onto the workhorse photomask using a film applicator with a 4 mil film flow opening made by Gardner Laboratories.

The adhesive was spread by laying a bead of adhesive along one edge of the photomask in front of the film applicator and drawing the applicator across the photomask. Then the photomask was baked, with adhesive, in a forced convection oven at 200° F. for 2 minutes to cure the adhesive. A release backing was then put on to protect the adhesive.

Before use, the release backing was removed from the photomask, taking care to not kink or wrinkle the photomask. The photomask was pressed onto the photoresist with gloved fingers under yellow light and gradually worked across the mask, smoothing out all air pockets.

Exposure

The object was exposed to a UV fluorescent bulb with a peak output between 365 and 405 nanometers to expose the photoresist. The correct distance between the light source and the photoresist was determined by the use of a photoresist photometer by International Light. The sensitivity was set at 0.03 and the light sensor was moved outwardly from the light source until the meter read 0.26 to determine the correct position for the part. The object was exposed for about 25 minutes. The light passed through the clear dots in the photomask and exposed the photoresist.

Developing

After exposure, the photomask was removed. The object was then submerged in Shipley photoresist developer #351 for 2 minutes with constant agitation. The object was then rinsed thoroughly in clean water.

The object was put in a free convection oven for 20 minutes at 125° C. to hardbake the photoresist. This made the photoresist impervious to the etchant.

Etching

Ferric chloride (45° baumé) at room temperature was used to etch the object. A spray etcher or an etching bath of suitable size with constant agitation was used. The etchant first contacted the aluminum through the small holes in the photoresist and began to etch a pit. As the pit grows the photoresist was undermined and flaked away. The maximum pit size and depth was obtained when two adjacent pits grew large enough to just touch each other. This can be determined by visual inspection. At that point, the etching process was terminated as further etching will only degrade the optical properties of the surface. The etching takes about 10 minutes, however frequent inspection of the object after approximately 5 minutes is important for best results. The actual time required to complete the etching process will vary somewhat from part to part so the part should be visually checked periodically to see when the pits begin to touch. The object was rinsed thoroughly in water after its removal from the etchant.

The photoresist was stripped by dissolving it with acetone—either by dipping or spraying. The object was thoroughly rinsed in clean water.

Small areas may not etch properly and were touched up by "scribbling" over the area with an electric scriber. The scriber created small conical pits similar in size to the etched craters.

The object was then anodized according to the procedure outlined above and entitled "Basic Process of Wade U.S. Pat. No. 4,111,762." The object was next hot water sealed or, in accordance with another aspect of the present invention, steam sealed as described above.

What is claimed is:

1. In a process of making an object having a surface with improved capability for absorbing and reducing specular reflectance of infrared radiation having a wavelength greater than about 1 micron comprising the steps of anodizing an object composed of an anodizable metal to provide an anodized surface on the object, dying and sealing the anodized surface, the improvement comprising modifying the surface structure prior to anodizing to produce a series of major surface modifications at least about 100 microns in width and at least about 50 microns in depth.

2. A process as claimed in claim 1 wherein the depth of said major surface modifications is at least about ½ the width thereof.

3. A process as claimed in claim 1 wherein the major surface modifications form a random series of modifications from about 100 microns to about 1,000 microns wide and from about 50 microns to about 750 microns deep.

4. A process as claimed in claim 1 wherein the major surface modifications are produced by photoetching.

5. A process of making an object having a surface for absorbing infrared radiation and for reducing specular reflectance of infrared radiation comprising the steps of anodizing an object composed of an anodizable metal to provide an anodized surface on the object, dyeing the anodized surface, and reducing reflectance and improving resistance to atomic oxygen attack by sealing the anodized surface by contacting the surface with steam under a pressure of about 15 psig for about 30 minutes.

6. A process of making an object having a surface with improved capability for absorbing and reducing specular reflectance of electromagnetic radiation having a wavelength greater than about 1 micron comprising the steps of anodizing an object composed of an anodizable metal to provide an anodized surface on the object, dying and sealing the anodized surface, the improvement comprising modifying the surface structure prior to anodizing to produce a series of major surface modifications at least about 100 microns in width and about 50 microns in depth, and reducing reflectance and improving resistance to atomic oxygen attack by sealing the anodized surface by contacting the surface with steam under pressure for at least about 2 minutes.

7. A process as claimed in claim 6 wherein the depth of said major surface modifications is at least about ½ the width thereof.

8. A process as claimed in claim 6 wherein the major surface modifications form a random series of modifications from about 100 microns to about 1,000 microns wide and from about 50 microns to about 750 microns deep.

9. A process as claimed in claim 6 wherein the major surface modifications are produced by photoetching.

10. A process as claimed in claim 6 wherein the pressure is about 15 psig and the sealing time is about 30 minutes.

* * * * *